US012176199B2

(12) United States Patent
Brachthaeuser et al.

(10) Patent No.: US 12,176,199 B2
(45) Date of Patent: Dec. 24, 2024

(54) IONIZATION DEVICE AND MASS SPECTROMETER

(71) Applicant: Leybold GmbH, Cologne (DE)

(72) Inventors: Yessica Brachthaeuser, Cologne (DE); Thorsten Benter, Haan (DE); Marco Thinius, Wuppertal (DE); Michel Aliman, Oberkochen (DE)

(73) Assignee: Leybold GmbH, Cologne (DE)

( * ) Notice: Subject to any disclaimer, the term of this patent is extended or adjusted under 35 U.S.C. 154(b) by 484 days.

(21) Appl. No.: 17/616,495

(22) PCT Filed: May 11, 2020

(86) PCT No.: PCT/EP2020/063070
§ 371 (c)(1),
(2) Date: Dec. 3, 2021

(87) PCT Pub. No.: WO2020/244889
PCT Pub. Date: Dec. 10, 2020

(65) Prior Publication Data

US 2022/0230865 A1 Jul. 21, 2022

(30) Foreign Application Priority Data

Jun. 6, 2019 (DE) ..................... 10 2019 208 278.5

(51) Int. Cl.
*H01J 49/24* (2006.01)
*H01J 27/20* (2006.01)
(Continued)

(52) U.S. Cl.
CPC .......... *H01J 49/147* (2013.01); *H01J 27/205* (2013.01); *H01J 49/068* (2013.01); *H01J 49/24* (2013.01); *H01J 49/025* (2013.01); *H01J 49/26* (2013.01)

(58) Field of Classification Search
CPC ...... H01J 49/147; H01J 27/205; H01J 49/068; H01J 49/24; H01J 49/025; H01J 49/26
(Continued)

(56) References Cited

U.S. PATENT DOCUMENTS

| | | | |
|---|---|---|---|
| 5,561,292 | A | 10/1996 | Buckley et al. |
| 6,294,780 | B1 | 9/2001 | Wells et al. |

(Continued)

FOREIGN PATENT DOCUMENTS

| | | | |
|---|---|---|---|
| CN | 107004551 | A | 8/2017 |
| DE | 102007049350 | A1 | 4/2009 |

(Continued)

OTHER PUBLICATIONS

First Office Action (including Search Report) for Taiwanese application Serial No. 109118935 dated Dec. 12, 2023, 13 pages.

(Continued)

*Primary Examiner* — Michael Maskell
(74) *Attorney, Agent, or Firm* — Theodore M. Magee; Westman, Champlin & Koehler, P.A.

(57) ABSTRACT

The invention relates to an ionization device with an ionization space formed in a container, an inlet system for supplying a gas to be ionized to the ionization space, an electron source having at least one filament for supply of an electron beam to the ionization space, and an outlet system for letting the ionized gas out of the ionization space. Electron optics having at least two electrodes are disposed between the filament and the ionization space.

11 Claims, 1 Drawing Sheet

(51) Int. Cl.
*H01J 49/06* (2006.01)
*H01J 49/14* (2006.01)
*H01J 49/02* (2006.01)
*H01J 49/26* (2006.01)

(58) Field of Classification Search
USPC .......................................... 250/281, 282, 288
See application file for complete search history.

(56) References Cited

U.S. PATENT DOCUMENTS

| | | | | |
|---|---|---|---|---|
| 2007/0176115 | A1 | 8/2007 | Horsky et al. | |
| 2009/0194680 | A1* | 8/2009 | Quarmby .............. | H01J 49/147 250/282 |
| 2010/0270465 | A1 | 10/2010 | Raptakis et al. | |
| 2011/0278447 | A1 | 11/2011 | Syage et al. | |
| 2013/0153762 | A1 | 6/2013 | Munchmeyer et al. | |
| 2014/0374583 | A1 | 12/2014 | Prest et al. | |
| 2017/0278690 | A1 | 9/2017 | Aliman et al. | |
| 2020/0066476 | A1* | 2/2020 | De Castro ............... | H01J 37/12 |

FOREIGN PATENT DOCUMENTS

| | | | |
|---|---|---|---|
| DE | 102017005345 | A1 | 12/2017 |
| TW | 201626431 | A | 7/2016 |
| WO | 2016092696 | A1 | 6/2016 |

OTHER PUBLICATIONS

German Examination Notice dated Feb. 4, 2020 for corresponding German application Serial No. 102019208278.5, 7 pages.

PCT International Search Report dated Jul. 16, 2020 for corresponding PCT application No. PCT/EP2020/063070, 4 pages.

The Vacuum Technology Book, "Part 2: Know-how book", Apr. 1, 2013, pp. 1-140, XPO55712001, Retrieved from the Internet: URL: https://www.pfeiffer-vacuum.com/filepool/file/vacuum-technology-book/vacuum-technology-book-ii-part-2.pdf?request_locale=en_US&referer=2063, Section "Sputter process monitor (SPM) ion source" p. 110, Section 1.2.8 Conductance, pp. 16-17.

First Office Action for Chinese application Serial No. 202080041578.5 dated Jul. 17, 2023, 24 pages.

* cited by examiner

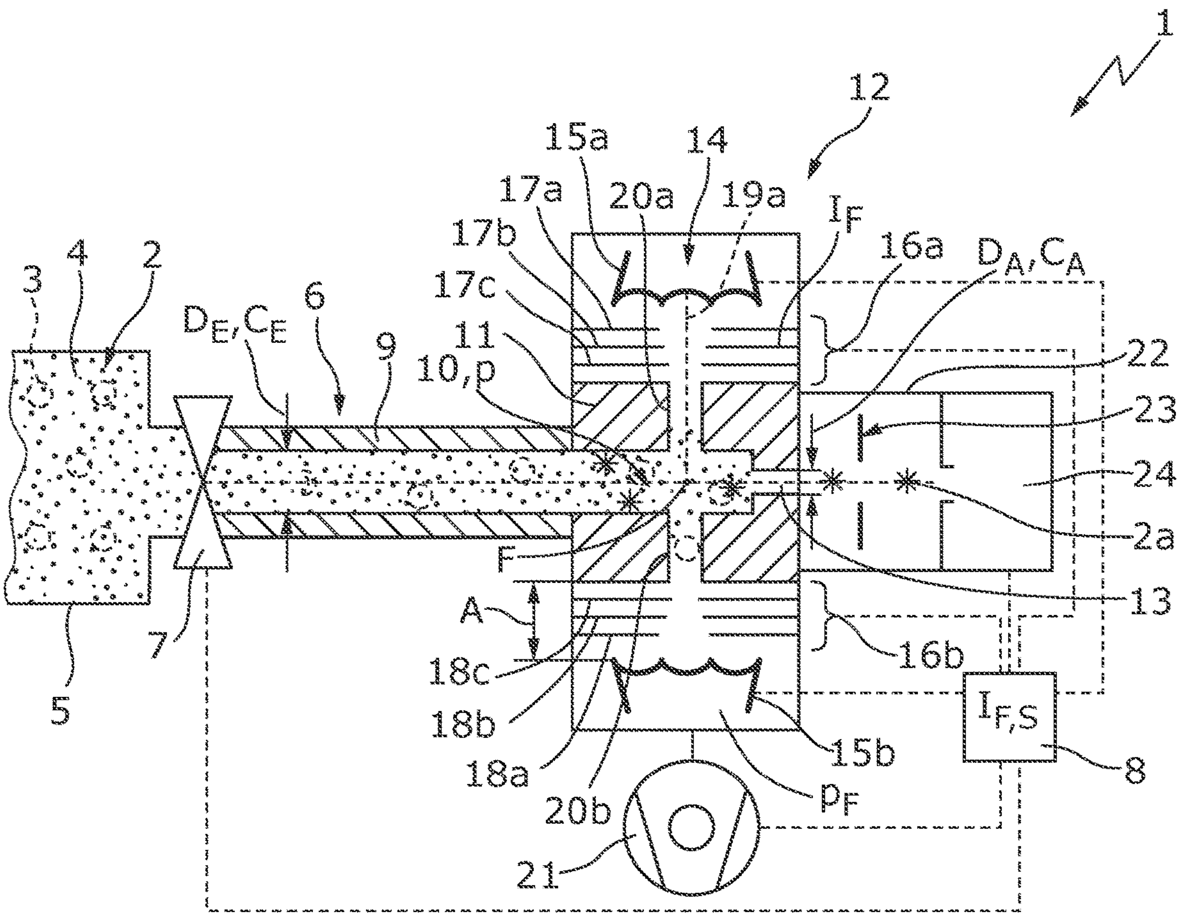
1
12
15a
14
17a
20a
19a
$I_F$
17b
16a
$D_A, C_A$
3
4
2
17c
$D_E, C_E$
6
9
11
22
10,p
23
24
2a
F
13
A
16b
18c
$I_{F,S}$
5
7
18b
15b
8
18a
$p_F$
20b
21

IONIZATION DEVICE AND MASS SPECTROMETER

CROSS-REFERENCE TO RELATED APPLICATION

This application is a Section 371 National Stage Application of International Application No. PCT/EP2020/063070, filed May 11, 2020, and published as WO 2020/244889 A1 on Dec. 10, 2020, which claims priority to German Patent Application 10 2019 208 278.5, filed Jun. 6, 2019, the entire disclosure of which is considered part of and is incorporated by reference in the disclosure of this application.

BACKGROUND

The invention relates to an ionization device, comprising: an ionization space formed in a container, an inlet system for supplying a gas to be ionized to the ionization space, an electron source having at least one filament for supply of an electron beam to the ionization space, and an outlet system for letting the ionized gas or an ionized gas component out of the ionization space. The ionized gas or ionized gas component is generally guided out of the ionization space in a controlled manner. The ionization device may have a further outlet system to let out the supplied (non-ionized) gas or gas component. The invention also relates to a mass spectrometer for mass-spectrometric analysis of a gas comprising: an ionization device designed as described above, and a detector for detection of the gas to be analysed that has been ionized in the ionization device.

Ionization devices for ionization of gases are required, for example, in trace analysis with the aid of mass spectrometry. Electron ionization uses an electron source having a filament (heating wire) for the ionization, in order, by means of the thermionic effect, to generate an electron beam that strikes the gas to be ionized and ionizes it.

If the gas to be analysed contains what are called S/C (semicon) matrix gases, for example hydrogen ($H_2$), halogens ($F_2$, $Cl_2$, $Br_2$), halogen compounds (HX, $CX_mH_n$; X=halogen), there may be detrimental reactions of these matrix gases or of matrix gas ions with the (metallic) material of the filament (e.g. W, Re, . . . ) which is typically operated at a temperature of up to 2000° C. The (positively charged) matrix ions are accelerated out of the ionization space formed in the container ("source block") in the direction of the filament and, when they reach the surface of the filament, typically have kinetic energies in the order of magnitude of about 70 eV.

Chemical reactions of the matrix gases $X_n$ or of the matrix gas ions $X_n^+$ with the metallic filament material Me include, inter alia:

$$X_n + Me \text{ -> } MeX_{n-m} + m\,X \quad (1)$$

$$X_n^+ + Me \text{ -> } Me^+X_n \text{ (sputtering)} \quad (2)$$

$$X_n^+ + Me \text{ -> } MeX_{n-m}^+ + m\,X \text{ (reactive sputtering)} \quad (3)$$
$$MeX_{n-m} + m\,X^+$$

The second reaction (2) occurs less commonly than the third reaction (3) at a kinetic energy of 70 eV of the matrix gas ions $X_n^+$. The reactions (1) and (3) are especially relevant when: $X_n$=$H_2$ or $X_n^+$=$H^+$, $H_2^+$, $H_3^+$, $N_2H^+$, $N_4H^+$, etc., but these reactions can also be relevant in the case of other S/C gases. In particular, reactive sputtering can occur in the case of the abovementioned matrix gases, i.e. chemical removal of the surface material of the filament.

Filaments are affected by the chemical removal of the surface material in general, i.e. not just in the presence of S/C gases. If the ionization device is operated at high pressures of up to about 0.01 mbar, however, the removal rate of the filament material distinctly increases, which drastically reduces the lifetime of the filament, for example to less than about 10 weeks in continuous operation. This problem exists particularly—but not exclusively—in the presence of the above-described S/C matrix gases.

U.S. Pat. No. 10,236,169 B2 describes an ionization device having a plasma generation device for generation of metastable particles and/or ions of an ionization gas in a primary plasma region. The metastable particles and/or ions of the ionization gas are supplied to a secondary plasma region in which a glow discharge is generated. The gas to be ionized is ionized in the secondary plasma region in which the pressure may be, for example, between 0.5 mbar and 10 mbar, which is generated essentially by the gas to be ionized. In the case of such an ionization device, it is possible to dispense with the use of a filament for ionization, which is typically usable only at pressures below about $10^{-4}$ mbar.

The discussion above is merely provided for general background information and is not intended to be used as an aid in determining the scope of the claimed subject matter. The claimed subject matter is not limited to implementations that solve any or all disadvantages noted in the background.

SUMMARY

The problem addressed by the invention is that of providing an ionization device and a mass spectrometer, wherein efficient ionization of a gas is possible even at high pressures by means of electron ionization.

This problem is solved by an ionization device of the type specified at the outset, in which an electron optics having at least two electrodes is mounted between the filament and the ionization space. The electron optics typically has an electrode arrangement having at least two, optionally three or more, electrodes. One electrode is typically required as anode in order to "gate" the electron beam or the electrons and hence move it/them in an accelerated manner in the direction of ionization block. The at least one further electrode can be used for different purposes, as described in detail hereinafter. The apertures of the electrodes through which the electron beam passes typically run along a common line of sight (a straight line) along which an opening is also formed in the container, through which the electron beam enters the ionization space.

In one embodiment, the electron optics is designed to focus the electron beam into the ionization space. For this purpose, the electron optics may have, for example, two or more electrodes typically having decreasing diameters in the direction of the ionization space. The focusing of the electron beam into the ionization space is advantageous for efficient ionization. For this purpose, the electron focus is positioned into the entry opening for the electrons into the ionization space, such that the maximum number of electrons can enter the ionization space. The ion beam focus of the ions of the matrix gas described further above that can leave the container through the same port in the direction of the filament is significantly different from the electron focus. Therefore, ions that leave the container in the direction of the surface of the filament are significantly defocused by the electron optics, which is exploited as an additional advantage and counteracts the degradation of the filament.

In a further embodiment, the electron optics is designed to measure an emission current of the filament at at least one electrode. In this case, the electrode serves as measurement electrode or as sensor for the measurement of the electron current generated owing to the thermionic effect. This exploits the fact that typically not all electrons in the electron beam pass through the opening in a particular electrode, and so some of the electrons strike or are scattered toward the measurement electrode. The number of electrons that strike the measurement electrode per unit time can be measured, for example, with the aid of a sensitive current measurement device, with the aid of a charge amplifier, etc., disposed in the electron optics or elsewhere in the ionization device.

In a development of this embodiment, the ionization device comprises a control device for control of the primary current or of the emission current of the filament to a target emission current. The control device may act, for example, on a power source of a resistance heater that serves to heat up the filament. The current that is generated by the power source and flows through the filament affects the temperature of the filament and hence the emission current. Alternatively, the control device can vary the voltage or potential at one or possibly more than one of the electrodes of the electron optics in order to adjust the emission current. The actual emission current that is measured by means of the measurement electrode is varied here until it corresponds to the target emission current, which may be chosen, for example, to be constant over time.

In a further embodiment, the electron optics has at least one switchable electrode for deflection of the electron beam away from an opening of the container. The switchable electrode serves to deflect the electron beam from the opening and hence to prevent entry of the electron beam into the ionization space. This is favourable, for example, if an already ionized gas enters the ionization device, or if blank samples are to be taken. What can be achieved by the deflection of the electron beam is that it does not enter the ionization space without the filament being switched off for that purpose, meaning that the temperature of the filament remains constant.

In a further embodiment, the filament is disposed at a distance of at least 0.5 cm, preferably of at least 3 cm, in particular of at least 5 cm, from the container. By virtue of the comparatively large distance from the ionization space or the container, the matrix gas stream that exits through the electron beam opening is greatly diluted, or the local gas pressure is greatly reduced, which has a positive effect on the filament lifetime. At the same time, the number of ions of constituents of the gas to be ionized that reach the filament is reduced. What can be achieved with the aid of the electron optics is that, in spite of the comparatively large distance, a sufficiently large number of electrons enters the ionization space.

In a further embodiment, the electron source comprises two filaments that preferably each serve to supply an electron beam through opposite openings in the container. The providing of two filaments in the electron source enables continued operation of the ion source if one filament has been damaged or destroyed and has to be changed. In general, therefore, just one filament is used in the operation of the ionization device, and hence just one electron beam is supplied to the ionization space.

In a further embodiment, the ionization device is designed to generate a pressure of more than $10^{-4}$ mbar and not more than 1 mbar in the ionization space. If there is a comparatively high pressure within the above-specified range in the ionization space, it is optionally possible to admit the gas to be analysed into the ionization device through the inlet system without the provision of additional pressure stages for pressure reduction.

In a further embodiment, the flow conductances of the inlet system and of the outlet system are set for different pressure ranges. Flow conductance values are a function of the local pressure. The flow conductance has the dimension of a suction capacity and is specified, for example, in liters/s. The flow conductance is the reciprocal of the flow resistance. The inlet system, more specifically a component e.g. in tubular form (e.g. a corrugated tube), that connects the container ("source block") to the process chamber containing the gas to be analysed typically has a greater flow conductance (and hence a lower flow resistance) than the outlet system. In the simplest case, the outlet system may be an outlet opening for the ionized gas, formed on the container. The tubular component for introduction of the gas to be ionized into the container and the outlet opening may be arbitrarily arranged, but also may be on opposite sides of the ionization space and on a line of sight.

The cross section or diameter of the tubular component may correspond to the cross section or to the diameter of the ionization space, while the cross section or diameter of the outlet system, in the simplest case the outlet opening, is smaller. The ratio of the flow conductances of the inlet system and the outlet system determines the average pressure in the ionization space that is to be maximized (typically to about 0.01 mbar).

A further aspect of the invention relates to an ionization device of the type specified at the outset, which may especially be configured according to the first aspect and which includes a vacuum generation device configured to generate a pressure at the filament of the electron source which is lower than a pressure in the ionization space. As described further above, the filament is typically operated at comparatively low pressures, whereas a comparatively high pressure should exist in the ionization space. It has therefore been found to be favourable when a vacuum generation device is disposed, or a vacuum connection is present, in the environment of the filament, in order to reduce the pressure in the region of the filament compared to the pressure in the ionization space. The vacuum generation device may, for example, be a separate vacuum pump provided for that purpose, for example a turbomolecular pump. Alternatively, the vacuum generation device may include or be what is called a split-flow pump, i.e. a pump that has two or more outlets for generation of two or more different gas pressures. In addition to the outlet for generation of the pressure in the region of the filament, a further outlet of the split-flow pump may be utilized, for example, for generation of a vacuum in a detector that serves for analysis of the ionized gas.

In one development, the vacuum generation device is designed to generate a pressure between $10^{-8}$ mbar and $10^{-4}$ mbar at the filament. It is favourable when the filament is operated at a pressure of less than about $10^{-4}$ mbar since this can prevent a high number of ions of the matrix gas from getting to the filament and leading to degradation of the filament material.

A further aspect of the invention relates to a mass spectrometer comprising: an ionization device designed as described further above, and a detector for detection of the gas to be analysed that has been ionized in the ionization device. The mass spectrometer typically additionally has an ion transfer device for transferring or for controlled guiding of the ionized gas from the ionization space into the detector.

The mass spectrometer may also have an extraction device for optionally pulsed extraction of the ionized gas from the ionization space, which may comprise one or more electrodes.

Further features and advantages of the invention are apparent from the description of working examples of the invention that follows, from the FIGURES in the drawing that show details essential to the invention, and from the claims. The individual features can each be implemented alone or in a plurality in any combination in one variant of the invention.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIG. 1 is a schematic diagram of a mass spectrometer with an ionization device for ionization of a gas that has an electron source with an electron optics.

DETAILED DESCRIPTION

In the description of the drawings that follows, identical reference numerals are used for components that are the same or have the same function.

FIG. 1 shows, in schematic form, a mass spectrometer 1 for mass-spectrometric analysis of a gas 2 to be ionized. The gas 2 includes a gas constituent in the form of a matrix gas 3, and further gas constituents, for example an etching product formed in the etching of a substrate. The gas 2 is present in a process space 4 outside the mass spectrometer 1 that forms the interior of a process chamber 5, of which FIG. 1 shows just part. The mass spectrometer 1 is connected to the process chamber 5 a via an inlet system 6. The connection may be formed, for example, by means of a flange. Instead of a gas 2 which is generated in an etching process, it is also possible by means of the mass spectrometer 1 to analyse a gas 2 which is formed in a coating process, in the cleaning of the process chamber 5, etc.

The inlet system 6 is controllable, meaning that the inlet system 6, in the example shown, has a fast-switching valve 7 by means of which the inlet system 6 can be opened or closed. The valve 7 can be actuated with the aid of a control device 8. The control device 8 may, for example, be a data processing system (hardware, software, etc.) suitably programmed to enable the control of the inlet system 6 and further functions of the mass spectrometer 1 (see below).

The inlet system 6 has a tubular component 9, in the form of a corrugated stainless steel hose in the example shown. The tubular component 9 is detachably connected, for example via a screw connection, to the mass spectrometer 1. By means of the controllable inlet system 6 with the tubular component 9 in the form of the corrugated hose, the gas 2 enters an ionization space 10 that forms the interior of a metallic heatable container 11 ("source block") of an ionization device 12 of the mass spectrometer 1. The corrugated hose 9 ends on one side of the ionization space 10 that is open on two opposite sides. The ionization device 12 has an outlet system which, in the example shown, takes the form of an exit opening 13 for exiting of the ionized gas 2*a* from the ionization space 10 of the container 11. The exit opening 13 is formed on the side of the container 11 opposite from the corrugated hose 9.

In the example shown in the FIGURE, the ionization device 12 has an electron source 14 with a first and second filament (heating wire) 15*a*, 15*b*. The ionization device 12 is connected for signalling purposes to the control device 8, in order to adjust a heat flow through the respective filament 15*a*, 15*b*. The control device 8 is also connected for signalling purposes to a first and second electron optics 16*a*, 16*b*. The first electron optics 16*a* is disposed between the first filament 15*a* and the ionization space 10, more specifically between the first filament 15*a* and a first opening 20*a* for entry of a (first) electron beam 19*a* into the ionization space 10. Correspondingly, the second electron optics 16*b* is disposed between the second filament 15*b* and the ionization space 10, more specifically between the second filament 15*b* and an opening 20*b* for entry of a second electron beam (not shown in the FIGURE) into the ionization space 10. The first electron optics 16*a* and the second electron optics 16*b* each have three electrodes 17*a-c*, 18*a-c*, which, in the example shown, can each be controlled individually by the control device 8. It will be apparent that the respective electron optics 16*a*, 16*b* has three electrodes 17*a-c*, 18*a-c* merely by way of example, and may also comprise more or fewer electrodes.

As apparent in the FIGURE, two filaments 15*a*, 15*b* are provided in the electron source 14, but only the first filament 15*a* generates an electron beam 19*a* in operation of the ionization device 12, which is supplied to the ionization space 10 via the opening 20*a*. The second filament 15*a*, by contrast, is inactive in operation of the ionization device 12. If the first filament 15*a* is damaged or fails entirely in the operation of the ionization device 12, the providing of the two filaments 15*a*, 15*b* enables continued operation of the ionization device 12 with the second filament 15*b* while the defective first filament 15*a* is changed, or vice versa. In the example shown, the openings 20*a*, 20*b* are disposed opposite one another in the heatable container 11, such that the filaments 15*a*, 15*b* are opposite one another along a line of sight (a straight line).

The electron source 14, more specifically the cylindrical interior thereof with the two filaments 15*a*, 15*b* in the example shown, is connected to the ionization space 10 in the container 11 only via the respective opening 20*a,b*. The respective filament 15*a*, 15*b* is disposed at a distance A from the container 11, which is more than 0.5 centimetre, about 3 cm in the example shown, but may optionally even be more than 5 cm. The comparatively large distance A of the filament 15*a*, 15*b* from the container 11 is enabled by the electron optics 16*a*, 16*b* and serves to reduce degradation of the metallic material of the filament 15*a*, 15*b*, for example tungsten or rhenium, by reactions with the matrix gases 3 or matrix gas ions present in the gas 2 to be ionized or in the ionized gas 2*a*.

This is advantageous especially in the case of the ionization device 12 shown in the FIGURE, which is designed to generate a comparatively high (static) pressure p in the ionization space 10, which may be between about $10^{-4}$ mbar and about 1 mbar and is about 0.01 mbar in the example shown. For generation of the comparatively high pressure p in the ionization space 10, a flow conductance $C_E$ of the inlet system 6 is greater than a flow conductance $C_A$ of the outlet system 13. In the example shown, the flow conductance $C_E$ of the inlet system 6 is predefined by the tubular component 9, more specifically by the diameter $D_E$ of the tubular component 9. The flow conductance $C_A$ of the outlet system 13 is predefined by the diameter $D_A$ of the outlet opening.

The ratio of the flow conductances $C_E/C_A$ determines the (average) pressure p in the ionization space 10, which should typically be maximized.

The effect of the high pressure p in the ionization space 10 is generally that a comparatively large number of atoms or molecules of the matrix gas 3 passes through the respective openings 20*a*, 20*b* from the container 10 into the interior of the electron source 14 and reaches the respective filament 15*a*, 15*b*.

In the example shown, the ionization device 12 has a vacuum generation device 21 in the form of a turbomolecular pump in order to generate a pressure $p_F$ less than the pressure p in the ionization space 10 in the interior of the electron source 14 and hence at the respective filament 15*a*, 15*b*. The pressure $p_F$ in the region of the respective filament 15*a*, 15*b* may lie, for example, within an interval between about $10^{-8}$ mbar and $10^{-4}$ mbar. The lower pressure $p_F$ distinctly reduces the number of particles of the matrix gas 3 that can react with the material of the filament 15*a*, 15*b*. In this way, it is possible to increase the lifetime of the filaments 15*a*, 15*b*.

In the example shown, the three electrodes 17*a-c*, 18*a-c* of the respective electron optics 16*a*, 16*b* are designed to focus the electron beam 19*a* to a focus position F within the ionization space 10. For this purpose, the electrodes 17*a-c*, 18*a-c* each have a central aperture, with decreasing diameter of the apertures with increasing distance from the respective filament 15*a*, 15*b*. Since the focus of the ions of the matrix gas 3 that leave the ionization space 10 via the opening 20*b* and enter the electron source 14, owing to their distinctly greater mass, differs significantly from the focus position F of the electron beam 19*a*, the ions of the matrix gas 3 are defocused by the electron optics 16*a*, 16*b* on exit from the ionization space 10 before they hit the filament 15*a*, 15*b*. This reduces the probability of a reaction with the material of the respective filament 15*a*, 15*b* and increases its lifetime.

In the example shown in the FIGURE, the electron optics 16*a*, more specifically the second electrode 17*b*, serves to measure the emission current $I_E$ of the first filament 15*a*. The emission current $I_E$ is understood to mean the number of electrons that exit from the first filament 15*a* per unit time. A measure of the emission current $I_F$ is the number of electrons that strike the second electrode 17*b* within a given time interval. This exploits the fact that a generally essentially constant proportion of the electrons exiting from the first filament 15*a* hits the second electrode 17*b*, and so this can serve as measurement electrode or as sensor for measurement of the (proportional) emission current $I_F$. The number of charges or electrons that hit the second electrode 17*b* per unit time may be measured, for example, with a current measurement device (not shown), for example in the form of a charge amplifier or the like, that forms part of the electron optics 16*a*. The control device 8 is in contact with the electron optics 16*a* and is designed to control the emission current $I_F$ of the filament 15*a* to a constant target emission current $I_{F,S}$ which is recorded in a memory device of the control device 8 and is typically determined depending on the gas 2 to be analysed. For the control of the emission current $I_F$, the control device 8 may act on a current source, for example, in order to vary the current through the first filament 15*a* and hence its temperature.

The third electrode 17*c* of the electron optics 16*a* is switchable in the example shown, meaning that its electrical potential can be switched between at least two different potential values. If, in a switching state, the electrical potential applied to the third electrode 17*c* or the difference to the electrical potential of the first filament 15*a* is sufficiently large, the electron beam 19*a* is deflected away from the opening 20*a* either back in the direction of the filament or toward the third electrode 17*c* and does not enter the ionization space 10 through the opening 20*a*. This is favourable, for example, if an already ionized gas enters the ionization device 12, or if it is the case that blank samples are to be taken. The third electrode 18*c* of the second electron optics 16*b* is designed correspondingly. By virtue of the switchable third electrode 17*c*, 18*c*, it is unnecessary to switch off or cool down the filament 15*a*, 15*b* if no electron beam 19*a* is to enter the ionization space 10, so that the temperature of the filament 15*a*, 15*b* remains constant. The electron source 14 can thus be operated in a pulsed manner, so that an electron beam 19*a* enters the ionization space 10 only if this is useful for the mass-spectrometric analysis of the gas 2.

The outlet system in the form of the exit opening 13 is followed, in the mass spectrometer 1, by an ion transfer device 22 for transfer of the ionized gas 2*a* from the ionization space 10 into a detector 24 in which the ionized gas 2*a* is analysed by mass spectrometry. The ion transfer device 22, in the example shown, has an extraction device 23 in the form of an electrode arrangement in order to extract the ionized gas 2*a* from the ionization space 10 and accelerate it in the direction of the ion transfer device and optionally to focus it, in order then to separate it by mass in the detector 24.

By means of the measures described further above, it is possible to distinctly increase the lifetime of the filament(s) 15*a*, 15*b* in the mass spectrometer 1 designed for ionization of the gas 2 to be analysed at high pressures p. In addition, it is possible to set a stable emission current $I_{E,S}$ of the respective filament 15*a*, 15*b*. It will be apparent that the ionization device 12 described further above can be used not just in a mass spectrometer 1 but also in many other fields of use in which a gas is to be ionized at comparatively high pressures.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An ionization device, comprising:

an ionization space formed in a chamber, an inlet system for supplying a gas to be ionized to the ionization space, an electron source having at least one filament for supply of an electron beam to the ionization space, and an outlet system for letting the ionized gas out of the ionization space, characterized in that an electron optics comprising at least two electrodes is installed between the filament and the ionization space wherein the electron optics are configured to use one of the at least two electrodes to measure an emission current of the filament.

2. The ionization device according to claim 1, in which the electron optics is designed to focus the electron beam into the ionization space.

3. The ionization device according to claim 1, further comprising: a control device for controlling the emission current of the filament to a target emission current.

4. The ionization device according to claim 1, in which the electron optics has at least one switchable electrode for deflecting the electron beam away from an opening in the container.

5. The ionization device according to claim 1, in which the filament is disposed at a distance of at least 0.5 cm.

6. The ionization device according to claim 1, in which the electron source comprises two or more filaments that each serve to supply one electron beam through opposing openings of the chamber.

7. The ionization device according to claim 1, designed to generate a pressure of more than $10^{-4}$ mbar and not more than 1 mbar in the ionization space.

8. The ionization device according to claim 1, in which a flow conductance of the inlet system is greater than a flow conductance of the outlet system.

9. The ionization device according to claim 1, having a vacuum generation device configured to generate a pressure ($p_F$) at the filament of the electron source that is lower than a pressure (p) in the ionization space.

10. The ionization device according to claim 9, configured to generate a pressure ($p_F$) between $10^{-8}$ mbar and $10^{-4}$ mbar at the filament.

11. A mass spectrometer for mass-spectrometric analysis of a gas comprising:

an ionization device according to claim 1, and a detector for detection of the gas to be analysed that has been ionized in the ionization device.

* * * * *